(12) United States Patent
Rasanen

(10) Patent No.: US 8,489,096 B2
(45) Date of Patent: Jul. 16, 2013

(54) INTER-ACCESS HANDOVER WITH ACCESS SPECIFIC POLICY CONTROL FUNCTIONS

(75) Inventor: Juha Rasanen, Espoo (FI)

(73) Assignee: Nokia Corporation, Espoo (FI)

( * ) Notice: Subject to any disclaimer, the term of this patent is extended or adjusted under 35 U.S.C. 154(b) by 1310 days.

(21) Appl. No.: 11/444,372

(22) Filed: Jun. 1, 2006

(65) Prior Publication Data

US 2007/0281699 A1    Dec. 6, 2007

(51) Int. Cl.
*H04W 36/00*    (2009.01)
*H04W 4/00*    (2009.01)
*G06Q 40/00*    (2012.01)

(52) U.S. Cl.
USPC .............................. 455/436; 370/331; 705/40

(58) Field of Classification Search
USPC ...................... 455/436, 448; 370/331; 705/40
See application file for complete search history.

(56) References Cited

U.S. PATENT DOCUMENTS

| | | | |
|---|---|---|---|
| 6,529,490 B1 | 3/2003 | Oh et al. | |
| 2002/0136226 A1 | 9/2002 | Christoffel et al. | |
| 2002/0188561 A1* | 12/2002 | Schultz ............................ | 705/40 |
| 2003/0103496 A1* | 6/2003 | Lakshmi Narayanan et al. ............................ | 370/352 |
| 2004/0018841 A1* | 1/2004 | Trossen ......................... | 455/436 |
| 2005/0071455 A1* | 3/2005 | Collins ........................... | 709/223 |
| 2005/0135375 A1* | 6/2005 | Hurtta et al. ............... | 370/395.2 |
| 2006/0002355 A1 | 1/2006 | Baek et al. | |
| 2008/0219218 A1* | 9/2008 | Rydnell et al. ................ | 370/331 |

FOREIGN PATENT DOCUMENTS

| | | |
|---|---|---|
| EP | 1 638 261 | 3/2006 |
| WO | WO 2005/089002 | 9/2005 |
| WO | WO-2006/000612 | 1/2006 |

OTHER PUBLICATIONS

Nokia, "Inter Access System Handover Between 3GPP and Non 3GPP Access System," Apr. 3-6, 2006, pp. 1-7.
Nortel, "QoS Concept-Call Flows for Split PCRF," Apr. 3-6, 2006, pp. 1-6.
International Search Report for PCT/IB2007/011284 filed May 18, 2007.
International Search Report for Application No. EP-07734592.4, dated Oct. 31, 2012.

* cited by examiner

*Primary Examiner* — Ariel Balaoing
(74) *Attorney, Agent, or Firm* — Alston & Bird LLP

(57) ABSTRACT

A system and method are provided to exchange information relating to mobility management during an inter-access handover. The system and method exchange information when an inter-access handover occurs during an ongoing policy and/or charging controlled session. The system and method offer a seamless inter-access handover without any interruptions or delays. Signaling trafficking is minimized that may be required to update the new control element with the required session information.

36 Claims, 10 Drawing Sheets

INTER-ACCESS HANDOVER WITH ACCESS SPECIFIC POLICY CONTROL FUNCTIONS

BACKGROUND OF THE INVENTION

1. Field of the Invention

The present invention relates to a system and method to exchange information relating to mobility management during an inter-access handover, more particularly, a system and method to exchange information when an inter-access handover occurs during an ongoing policy and/or charging controlled session.

2. Description of the Related Art

A Next Generation Network (NGN) IP Multimedia Subsystem (IMS) supports provision of Sessions Initiation Protocol (SIP)-based multimedia services to NGN terminals. IMS also supports the provision of Public Switched Telephony Network (PSTN)/Integrated Services Digital Network (ISDN) simulation services. Various access technologies may be used to access IMS, for example, General Packet Radio Service (GPRS), Digital Subscriber Line (xDSL), and Wireless Local Area Network (WLAN). Policy control functions have been standardized for the GPRS access (in $3^{rd}$ Generation Partnership Project (3GPP) known as Policy Decision Function (PDF) or as Policy and Charging Rules Function (PCRF), when charging control is included), are being standardized for, at least, the WLAN access.

In general, a system structure of a communication network is such that a subscriber's user equipment, such as a mobile station, a mobile phone, a fixed phone, a personal computer (PC), a laptop, a personal digital assistant (PDA) or the like, is connected via transceivers and interfaces, such as an air interface, a wired interface or the like, to an access network subsystem. The access network subsystem controls the communication connection to and from the user equipment and is connected via an interface to a corresponding core or backbone network subsystem. The core (or backbone) network subsystem switches data transmitted via the communication connection to a destination, such as another user equipment, a service provider (server/proxy), or another communication network. It is to be noted that the core network subsystem may be connected to a plurality of access network subsystems. Depending on the used communication network, the actual network structure may vary, as known for those skilled in the art and defined in respective specifications, for example, for Universal Mobile Telecommunications System (UMTS), Global System for Mobile Communication (GSM) and the like.

Generally, for properly establishing and handling a communication connection between network elements such as the user equipment and another user equipment, a database, a server, etc., one or more intermediate network elements such as support nodes or service nodes are involved. One or more connection parameters are used for defining connection characteristics. This includes, for example, a packet based data transmission protocol information, such as a PDP (Packet Data Protocol) context information, for example, information about quality of service (QoS) requested or provided, charging-related information, such as a charging class, etc. IMS specific information, Authorization Token or UE IP address or user/UE identity and Flow ID(s) are used as binding information when requesting QoS authorization for a PDP context.

When the communication connection is initialized, an authorization for the connection parameters of services is requested from a policy control entity which decides on connection parameters to be authorized for the communication connection and on service types which can be provided for the communication connection.

Both, push and pull modes may be used for obtaining an authorization decision from a policy decision function (PDF/ Service Policy Decision Function (SPDF)/PCRF) to a gateway. In a push operation, the PDF sends the information without being requested by the gateway. In a pull operation, the gateway requests the PDF to send the information to the gateway.

When a typical inter-access handover, that is, a handover from a Digital Subscriber Line (xDSL) access to General Packet Radio Service (GPRS) access or vice versa, occurs during an ongoing policy and/or charging controlled session, the policy control entity changes. Accordingly, problems occur in which a session control element, such as a Proxy Call Session Control Function (P-CSCF) in IMS or an Application Function (AF), needs to determine or identify a new policy control entity. A system and method are needed that would allow the AF/P-CSCF to obtain an IP address of the new PCRF. The system and method would allow the new policy control entity to obtain session related parameters for making an authorization decision for a new session, to obtain subscriber or service specific parameters, and/or to find the new gateway. The new gateway would need to be provided the ability to find the application function used by the session. Also, for an existing session being transferred, the system and method would need to provide the policy control entity the ability to obtain an already made authorization decision.

SUMMARY OF THE INVENTION

In accordance with an embodiment of the present invention, there is provided an inter-access handover method and computer program embodied on a computer readable medium for performing an inter-access handover including exchanging a handover mobility signal between a user equipment (UE) and a new gateway, transmitting information parameters from the new gateway to an old gateway in response to the handover mobility signal, transmitting the information parameters from the old gateway to an old policy control function, and requesting session information of an ongoing session from an application function by the old policy control function. The inter-access handover method and the computer program embodied on a computer readable medium for performing an inter-access handover further include transmitting, based on the information parameters, the session information, possible service or subscription related information, and/or an IP address of the new gateway from the application function or the old policy control function to a new policy control function, and transmitting an authorization decision from the new policy control function to the new gateway to continue the session through the new gateway and the new policy control function.

In accordance with an embodiment of the present invention, there is provided an inter-access handover method and computer program embodied on a computer readable medium for performing an inter-access handover including transmitting a handover mobility signal from a user equipment (UE) to a new gateway, transmitting information parameters from the new gateway through the UE to an old gateway in response to the handover mobility signal, transmitting, based on the information parameters, mobility signaling parameters from the old gateway through the UE to the new gateway, the mobility signaling parameters including an IP address of an old policy control function and/or an IP address of an application function, and reporting the mobility signaling parameters from the new gateway to a new policy control function to request authorization for at least one ongoing session. The inter-access handover method and the computer program embodied on a computer readable medium for performing an inter-access handover also include transmitting an authorization decision from the new policy control function to the new gateway to continue the at least one ongoing session through the new gateway and the new policy control function.

In accordance with an embodiment of the present invention, there is provided a direct inter-access handover method and computer program embodied on a computer readable medium for performing a direct inter-access handover including transmitting a handover mobility signal from a user equipment (UE) to a new gateway, transmitting information parameters from the new gateway to the UE in response to the handover mobility signal, transmitting an information request from the new gateway to an old gateway, transmitting an information response from the old gateway to the new gateway, the information response comprising the information parameters including an IP address of an old policy control function and/or an IP address of an application function, transmitting, based on the information response, mobility signaling parameters from the new gateway to a new policy control function to request authorization for at least one ongoing session, and transmitting an authorization decision from the new policy control function to the new gateway to continue the at least one ongoing session through the new gateway and the new policy control function.

In accordance with an embodiment of the present invention, there is provided an inter-access handover system including a new gateway configured to receive a handover mobility signal from a user equipment (UE) and to transmit information parameters to an old gateway in response to the handover mobility signal. An old policy control function is configured to receive the information parameters from the old gateway and configured to receive session information of an ongoing session. A new policy control function is configured to receive from an application function or the old policy control function, based on the information parameters, the session information, possible service or subscription related information, and/or an IP address of the new gateway, and configured to transmit an authorization decision to the new gateway to continue the session through the new gateway and the new policy control function.

In accordance with an embodiment of the present invention, there is provided an inter-access handover system, including a new gateway configured to receive a handover mobility signal from a user equipment (UE), an old gateway configured to receive information parameters from the new gateway through the UE in response to the handover mobility signal and configured to transmit through the UE to the new gateway, based on the information parameters, mobility signaling parameters, the mobility signaling parameters including an IP address of an old policy control function and/or an IP address of an application function, and a new policy control function configured to receive the mobility signaling parameters from the new gateway and a request for authorization for at least one ongoing session, and configured to transmit an authorization decision to the new gateway to continue the at least one ongoing session through the new gateway and the new policy control function.

In accordance with an embodiment of the present invention, there is provided a direct inter-access handover system, including a new gateway configured to receive a handover mobility signal from a user equipment (UE) and configured to transmit information parameters to the UE in response to the handover mobility signal, an old gateway configured to receive an information request from the new gateway and configured to transmit an information response comprising the information parameters to the new gateway, the information response including an IP address of an old policy control function and/or an IP address of an application function, and a new policy control function configured to receive from the new gateway, based on the information response, mobility signaling parameters to request authorization for at least one ongoing session, and configured to transmit an authorization decision to the new gateway to continue the at least one ongoing session through the new gateway and the new policy control function.

In accordance with an embodiment of the present invention, there is provided an inter-access handover method including transmitting information parameters from a gateway to an old policy control function in response to a handover mobility signal from a user equipment (UE), requesting session information of an ongoing session from an application function by the old policy control function, transmitting, based on the information parameters, the session information, possible service or subscription related information, and/or an IP address of the gateway from the application function or the old policy control function to a new policy control function, and transmitting an authorization decision from the new policy control function to the gateway to continue the session through the new policy control function.

In accordance with an embodiment of the present invention, there is provided an inter-access handover method including transmitting mobility signaling parameters through a user equipment (UE) to a gateway in response to a handover mobility signal from the UE, the mobility signaling parameters including an IP address of an old policy control function and/or an IP address of an application function, reporting the mobility signaling parameters from the gateway to a new policy control function to request authorization for at least one ongoing session, and transmitting an authorization decision from the new policy control function to the gateway to continue the at least one ongoing session through the new policy control function.

In accordance with an embodiment of the present invention, there is provided an direct inter-access handover method including transmitting a handover mobility signal from a user equipment (UE) to a gateway, transmitting information parameters from the gateway to the UE in response to the handover mobility signal, transmitting, based on the information parameters, mobility signaling parameters from the gateway to a new policy control function to request authorization for at least one ongoing session, the information parameters including an IP address of an old policy control function and/or an IP address of an application function, and transmitting an authorization decision from the new policy control function to the gateway to continue the at least one ongoing session through the new policy control function.

In accordance with an embodiment of the present invention, there is provided an inter-access handover system including a gateway configured to transmit information parameters in response to a handover mobility signal fro ma user equipment (UE), an old policy control function configured to receive the information parameters from the gateway and configured to receive session information of an ongoing session, an application function, and a new policy control function configured to receive from the application function or the old policy control function, based on the information parameters, the session information, possible service or subscription related information, and/or an IP address of the gateway, and configured to transmit an authorization decision to the gateway to continue the session through the new policy control function.

In accordance with an embodiment of the present invention, there is provided an inter-access handover system, including a gateway configured to receive a handover mobility signal from a user equipment (UE), and configured to transmit, based on information parameters, mobility signaling parameters, wherein the mobility signaling parameters include an IP address of an old policy control function and/or an IP address of an application function, and a new policy control function configured to receive the mobility signaling parameters from the gateway and a request for authorization for at least one ongoing session, and configured to transmit an authorization decision to the gateway to continue the at least one ongoing session through the new policy control function.

In accordance with an embodiment of the present invention, there is provided a direct inter-access handover system, including a gateway configured to receive a handover mobility signal from a user equipment (UE), and configured to transmit information parameters to the UE in response to the handover mobility signal, and a new policy control function configured to receive, based on the information parameters, mobility signaling parameters from the gateway requesting authorization for at least one ongoing session, the information parameters including an IP address of an old policy control function and/or an IP address of an application function, and configured to transmit an authorization decision to the gateway to continue the at least one ongoing session through the new policy control function.

BRIEF DESCRIPTION OF THE DRAWINGS

Further embodiments, details, advantages and modifications of the present invention will become apparent from the following detailed description of the preferred embodiments which is to be taken in conjunction with the accompanying drawings, in which.

DETAILED DESCRIPTION OF THE PREFERRED EMBODIMENTS

Reference will now be made in detail to the preferred embodiments of the present invention, examples of which are illustrated in the accompanying drawings. The embodiments of the present invention described below provide a system and method to exchange information relating to mobility management during an inter-access handover. The system and method exchange information when an inter-access handover occurs during an ongoing policy and/or charging controlled session.

The NGN IMS, also known as "Core IMS" is a subset of $3^{rd}$ Generation Partnership Project (3GPP) IMS. Core IMS is restricted to session control functionalities. Application Servers (AS) and transport/media functions such as the Multimedia Resource Function Processor function (MRFP) and the IP Multimedia Gateway Functions (IM-MGW) are considered to be outside the "Core IMS."

Figure 1:
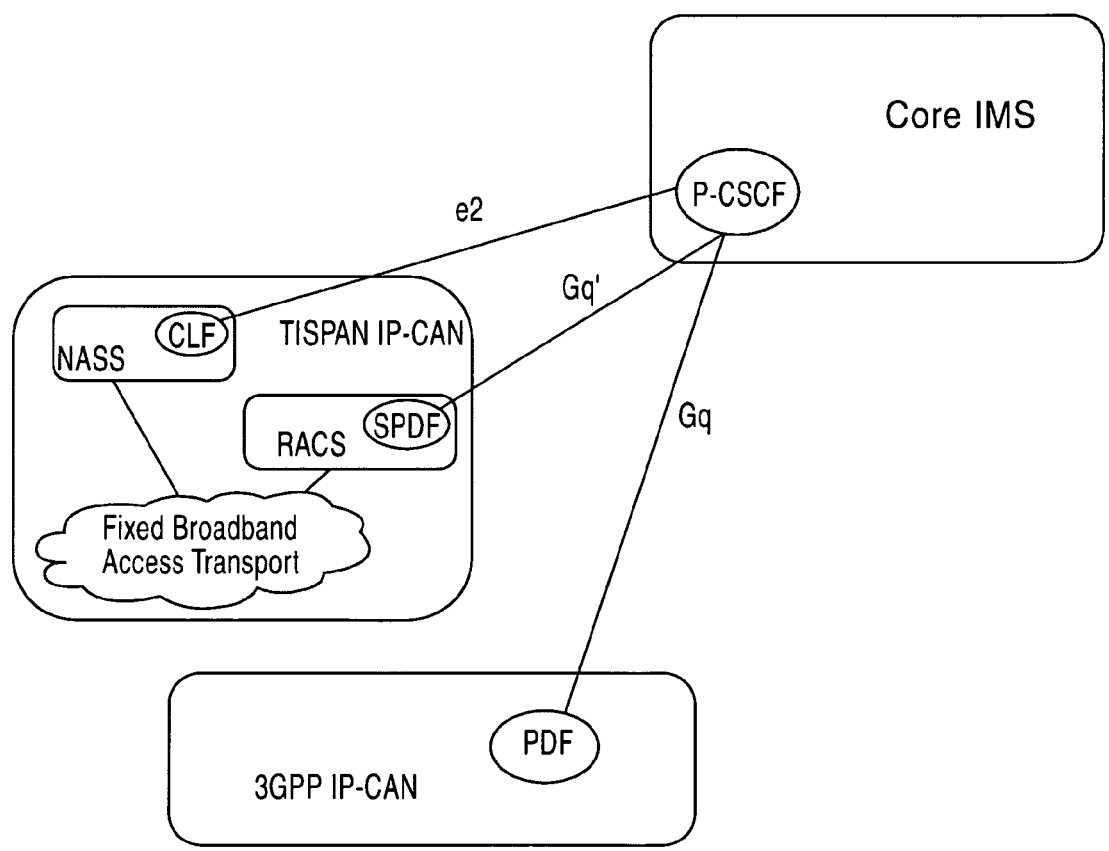
FIG. 1 illustrates a position of the IMS in an overall NGN architecture, in accordance with an embodiment of the present invention.

FIG. 1 illustrates a position of the IMS in an overall NGN architecture, in accordance with an embodiment of the present invention. The IMS provides services to a User Equipment (UE) connected via a plurality of IP connectivity access networks. FIG. 1 illustrates a case where an IMS subsystem provides services to the UE connected to a fixed broadband access network and to other user equipment connected via GPRS based IP-CAN.

Figure 2:
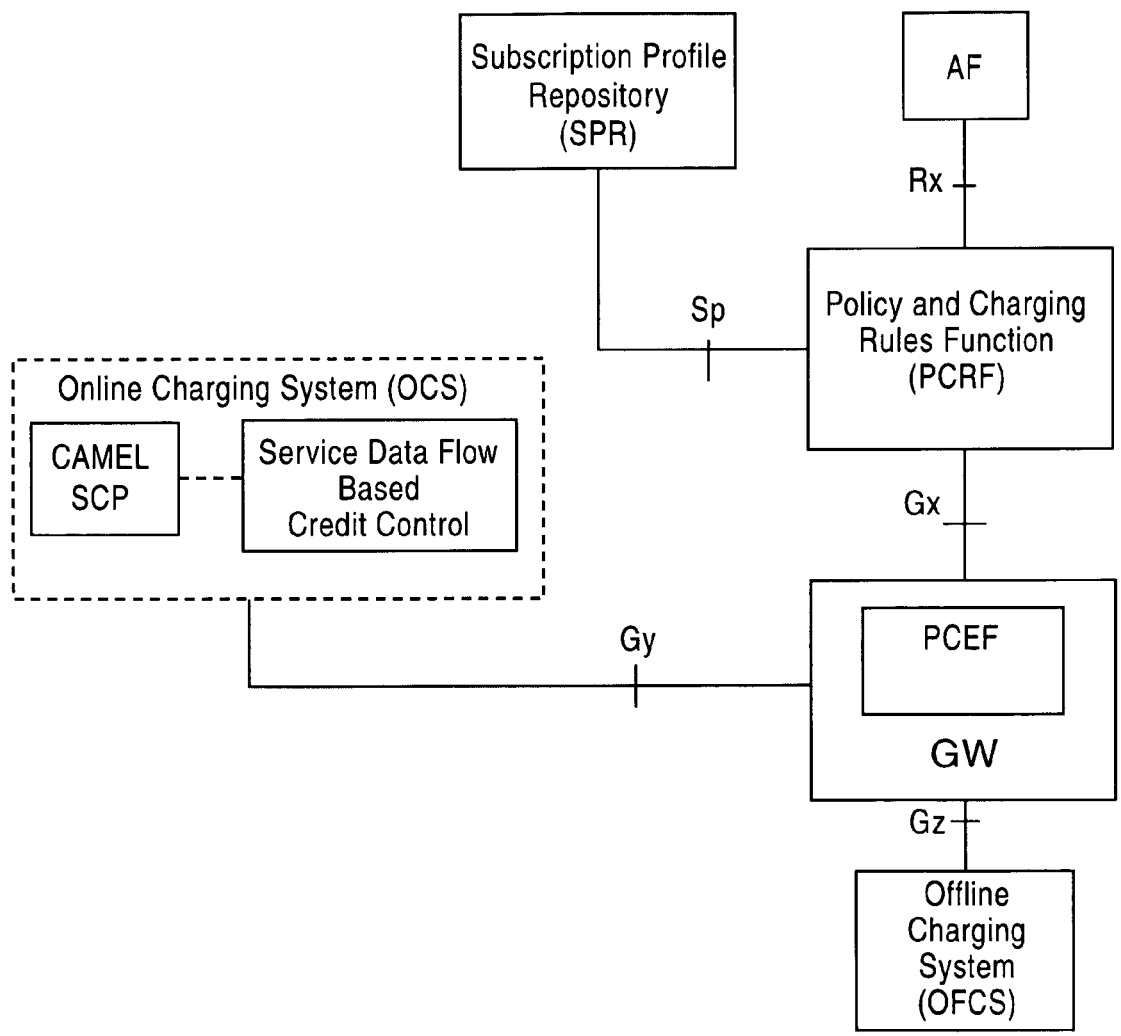
FIG. 2 illustrates a Policy and Charging Control (PCC) system architecture, in accordance with an embodiment of the present invention.

FIG. 2 illustrates a Policy and Charging Control (PCC) system architecture, in accordance with an embodiment of the present invention. The PCC architecture includes a Policy and Charging Enforcement Function (PCEF) in a gateway (GW), a Policy Control and Charging Rules Function (PCRF), an Application Function (AF), an Online Charging System (OCS), an Offline Charging System (OFCS), and a Subscription Profile Repository (SPR). The PCC architecture may extend the architecture of an IP Connectivity Access Network (IP-CAN), where the PCEF is a functional entity in a gateway node implementing an IP access to a PDN (for instance, for GPRS, GGSN, and for WLAN, the PDG). The PCRF provides network control regarding service data flow detection, gating, QoS, and flow based charging towards PCEF. The PCRF applies security procedures, as required by the operator, before accepting service information from the AF. The PCRF also decides how a certain service data flow is to be treated in the PCEF and ensures that the PCEF user plane traffic mapping and treatment is in accordance with a user's subscription profile.

Furthermore, the PCRF may check that the service information provided by the AF is consistent with the operator defined policy rules before storing service information. The service information may be used to derive the QoS for a particular service. The PCRF may reject a request received from the AF and, as a result, the PCRF may indicate, in the response to the AF, that the service information cannot be accepted by the PCRF. Subscription information may be used by the PCRF as basis for the policy and charging control decisions. The subscription information may apply to session based and non-session based services.

In turn, AF is a functional entity that communicates with the PCRF to transfer dynamic session information. The transfer of the dynamic session information is based on either an end user IP address and/or other UE identity information the AF may include. One example of the AF is a Proxy Call Session Control Function (P-CSCF).

Further, in FIG. 2, Reference point Rx between the AF and the PCRF enables transport of application level session information from the AF to PCRF. Such information may include, for instance, IP filter information to identify service data flow for gating control and/or differentiated charging, and media/application bandwidth requirements for Quality of Service (QoS) control. Reference point Gx resides between the PCEF in the GW and the PCRF to enable signaling of PCC rules, which govern the PCC behavior and supports, for instance, initialization and maintenance of connection, request for PCC rules from PCEF to PCRF, provision of the PCC rules from PCRF to PCEF, and indication of Bearer Service Termination from the PCEF to PCRF. Reference point Sp lies between the SPR and the PCRF and allows the PCRF to request subscription information related to bearer level policies from the SPR based on a subscriber identification. The reference point Sp allows the SPR to notify the PCRF when the subscription information has been changed if the PCRF has requested such notification. Reference point Gy resides between the OCS and the PCEF and allows online credit control for service data flow based charging. Reference point Gz resides between the PCEF and the OFCS and enables transport of service data flow based offline charging information.

Figure 3:
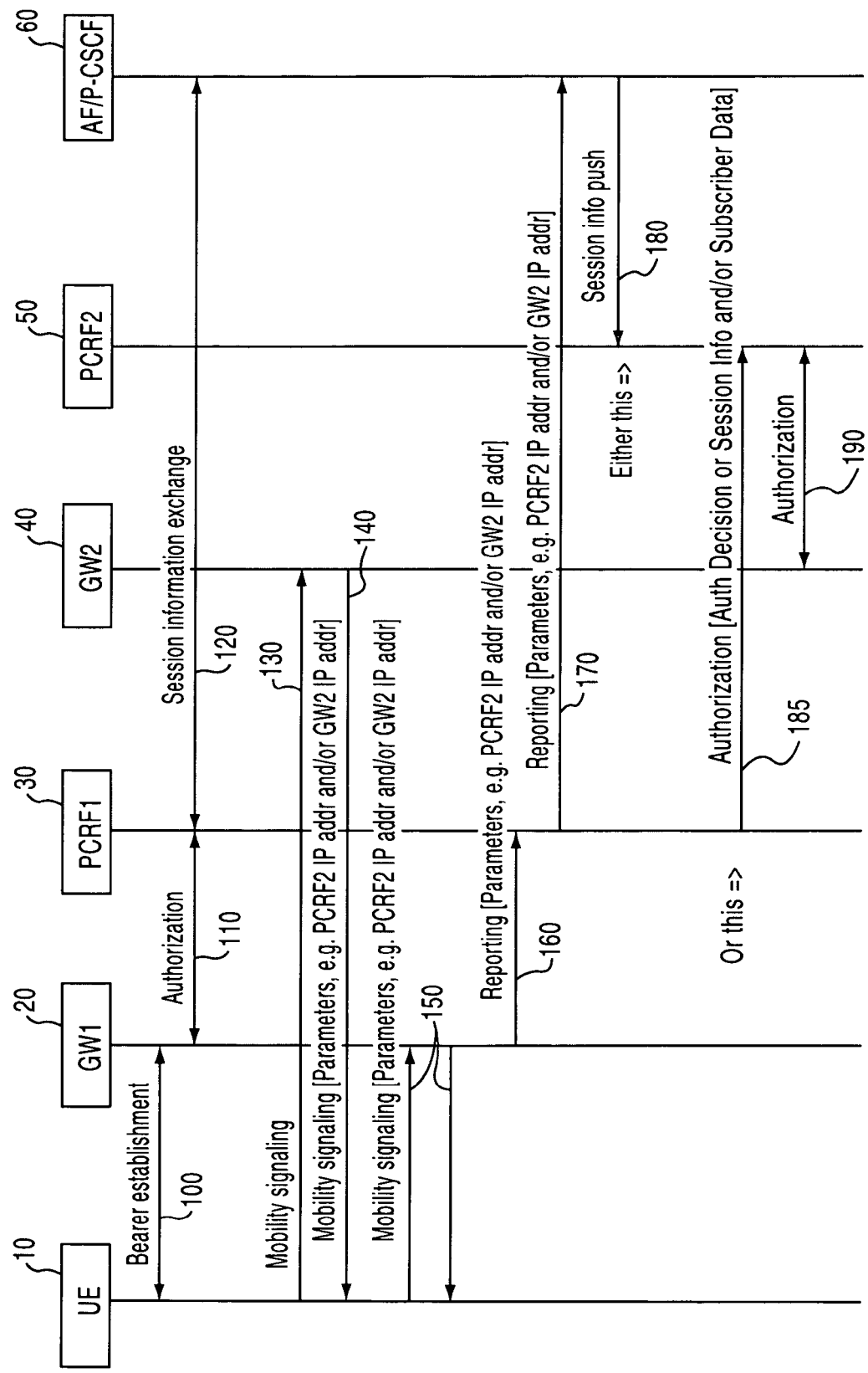
FIG. 3 illustrates an inter-access handover via a mobile user equipment (UE) with access specific policy control functions between an old gateway and AF/P-CSCF and between a new gateway and AF/P-CSCF, in accordance with an embodiment of the present invention.

FIG. 3 illustrates an inter-access handover via a mobile user equipment (UE) with access specific policy control functions between an old gateway and AF/P-CSCF and between a new gateway and AF/P-CSCF, in accordance with an embodiment of the present invention. As illustrated in FIG. 3, a mobile user equipment (UE) 100 exchanges information between an old gateway (GW1) 20, an old Policy Control and Charging Rules Function (PCRF1) 30, a new gateway (GW2) 40, a new Policy Control and Charging Rules Function (PCRF2) 50, and an Application Function (AF)/Proxy Call Session Control Function (P-CSCF) 60.

In order to support mobility, the GW1 20 needs to exchange information with the GW2 40. Accordingly, at step 100, a mobile user equipment (UE) 10 service is set-up between the UE 10 and the AF/P-CSCF 60 of a service provider. In order to initiate an application session, the set-up of the session and activation of the service require an establishment of a bearer service to carry data packets of the session. The session may include one or a plurality of different IP flows with specific requirements for bearer resources. Accordingly, the UE 10 transmits a request for a bearer establishment to the GW1 20. The GW1 20 accepts the request and assigns an IP address to a user or subscriber of the UE 10.

At step 110, the GW1 20 determines that an authorization is required and, accordingly, requests the authorization from the PCRF1 30 of allowed service(s) and rules information associated with the UE 10, such as Policy and Charging Control (PCC) rules. The request by a gateway is known as a pull operation. At step 120, the PCRF1 30 may request from the AF/P-CSCF 60 an update of the session related information, which PCRF1 30 has received earlier upon the session setup signaling, and/or from a subscriber register (not shown) or from the AF/P-CSCF the subscriber's subscription related information, the PCRF1 30 exchanges session information with the AF/P-CSCF (and/or the subscriber register) in order to receive the session and/or subscription related information. The AF/P-CSCF would reply with the session and/or subscription related information containing information about the allowed service(s) for the UE 10 and PCC rules information. The PCRF1 30 would make authorization and policy decisions and send such policy decisions back to the GW1 20. The GW1 20 would enforce the policy decisions, thereby acknowledging the bearer establishment request. In an alternative, a push operation is used, i.e. the PCRF1 30 sends the authorization information to the gateway GW1 20 without a prior request from the GW1 20.

At step 130, a mobility signaling is transmitted from the UE 10 to the new gateway GW2 for the inter-access handover. At step 140, the GW2 40 transmits information parameters to the UE 10 to support mobility. Such information parameters may include, for instance, identity associated with the GW2 40, IP address of the GW2 40, IP address associated with the PCRF2 50, and/or IP address of the AF/P-CSCF 60 to find the GW2 40.

At step 150, the UE 10 exchanges information with the GW1 20 for mobility. Specifically, the UE 10 exchanges the information parameters with the GW1 20. At step 160, the GW1 20 sends an indication/report of the handover with the information parameters to the old policy control function, PCRF1 30. At step 170, upon processing of the information parameters, the PCRF1 30 requests session information for the ongoing sessions from the AF/P-CSCF 60 to be sent from the application function AF/P-CSCF 60 to the new Policy and Charging Rules Function the PCRF2 50 based on the information parameters. The request would also provide the information parameters to the AF/P-CSCF 60. The request from the PCRF1 30 may also include authorization information, e.g. an authorization made previously by the PCRF1 30 for the session, or session related parameters. The request from the PCRF1 30 may also include service or subscription related information, thereby the PCRF2 50 would not need to issue a separate request for this subscription related information from subscriber registers, thus, saving processing time. Furthermore, if the IP address of the PCRF2 50 is in the request from the PCRF1 30, the AF/P-CSCF 60 uses the IP address of the PCRF2 50 as a contact address to the PCRF2 50. On the other hand, if the IP address of the PCRF2 50 is not included in the request but a parameter is included in the request indicative of a new type of handover access, and, consequently, indicative of a need to use a new PCRF to continue with the HANDOVER session, the AF/P-CSCF 60 determines the IP address of the new PCRF from the parameter and the IP address of the UE 10 or other identity information available from the UE 10. After step 170, the inter-access handover proceeds to either step 180 or step 185.

In one aspect of the present invention, at step 180, the AF/P-CSCF 60 pushes the authorization information or session information and the possible service or the subscription related information to the PCRF2 50. The AF/P-CSCF 60 may also send IP address of the GW2 40 to enable the PCRF2 50 to find the GW2 40. The inter-access handover proceeds to step 190.

In an alternative, at step 185, the PCRF1 30 sends an authorization message including an authorization decision or session information and/or subscriber data directly to the PCRF2 50 because the PCRF1 30 has the information and the IP address of the PCRF2 50. In this instance, the AF/CSCF 60 updates the PCRF related information, the session which is now managed by the PCRF2 50 instead of the PCRF1 30, when receiving the reporting message (step 170) from the PCRF1 30. The inter-access handover proceeds to step 190.

At step 190, the PCRF2 50 sends an authorization decision to the GW2 40 or, in the alternative, the GW2 40 may request the authorization decision from the PCRF2 50. Accordingly, the GW2 40 enforces the policy decision based on the PCRF2 50 authorization and the IP session may continue through the new access (i.e., through the GW2 40 and the PCRF2 50).

Figure 4:
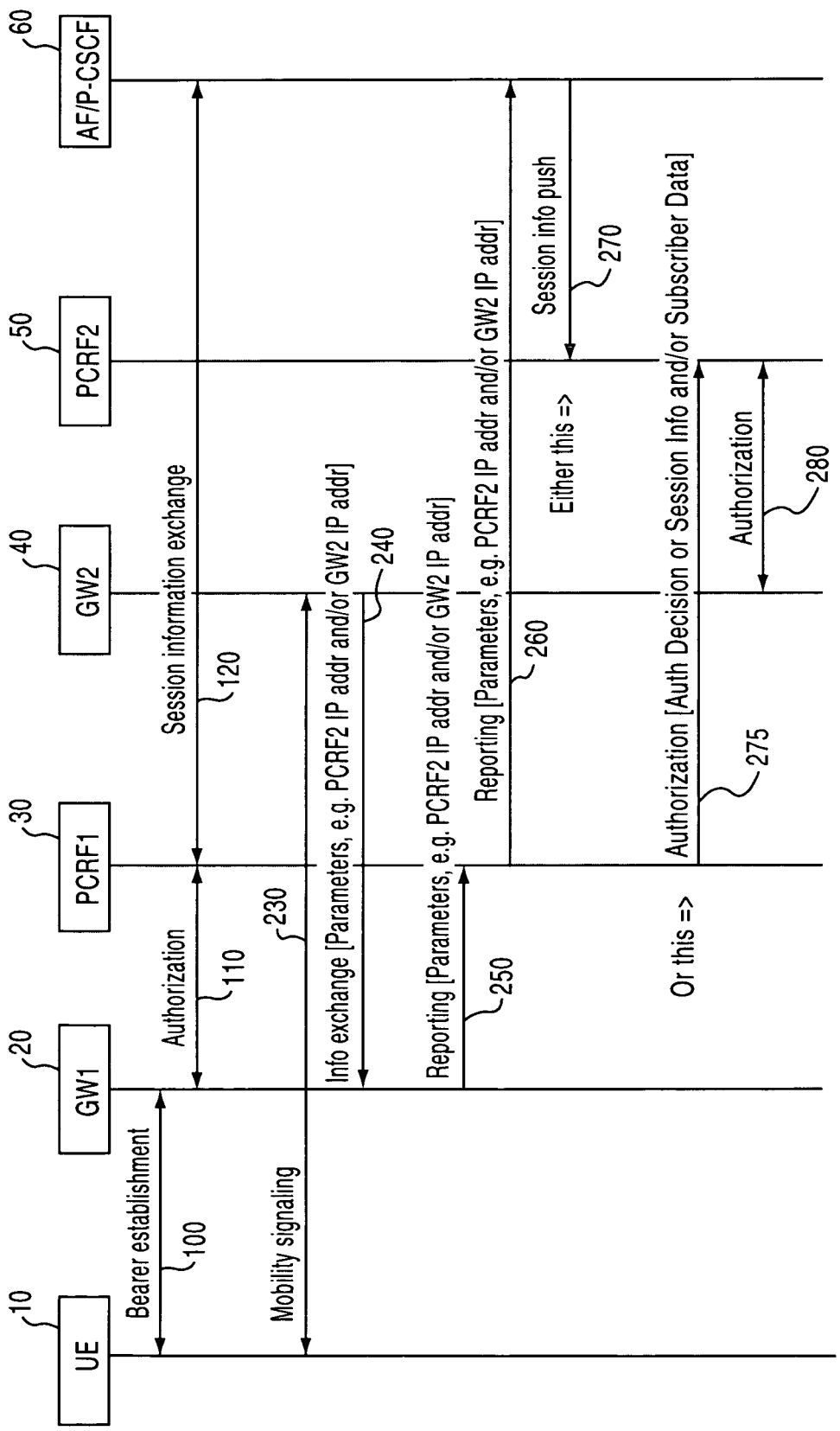
FIG. 4 illustrates a direct inter-access handover signaling between the old gateway and the new gateway, in accordance with an embodiment of the present invention.

FIG. 4 illustrates a direct inter-access handover signaling between the old gateway, GW1 20, and the new gateway, GW2 40, in accordance with an embodiment of the present invention. Similarly to the embodiment illustrated in FIG. 3, FIG. 4 illustrates the mobile user equipment (UE) 100 exchanging information between the GW1 20, the old Policy Control and Charging Rules Function (PCRF1) 30, the new gateway (GW2) 40, the new Policy Control and Charging Rules Function (PCRF2) 50, and the Application Function (AF)/Proxy Call Session Control Function (P-CSCF) 60.

The description corresponding to steps 100 to 120 described in FIG. 3 are incorporated herein. From step 120, the handover proceeds to step 230. At step 230, the mobility signaling is requested from the UE 10 to the new gateway GW2 for the inter-access handover and the GW2 40 transmits the information parameters to the UE 10 to support mobility. The request from the UE 10 the GW2 40 may contain, in addition to other related parameters, the IP address or identity information of the old gateway GW1 20. That is, the request from the UE 10 to the GW2 40 may include an IP address or identity information of the GW1 20, in which the GW2 40 may use the IP address or the identity information of the GW1 20 to find the GW1 20.

For instance, in FIG. 4, the GW2 40 sends to the GW1 20 information parameters which may comprise identity associated with the GW2 40, IP address of the GW2 40, and/or IP address associated with the PCRF2 50. At step 250, the GW1 20 sends the indication/report of the handover with the information parameters to the old policy control function, PCRF1 30. At step 260, the PCRF1 30 requests session information for the ongoing sessions from the AF/P-CSCF 60 to be sent from the application function AF/P-CSCF 60 to the new Policy and Charging Rules Function, the PCRF2 50. The request would also provide the information parameters to the AF/P-CSCF 60. The request from the PCRF1 30 may also include authorization information, e.g., an authorization made previously by the PCRF1 30 for the session, or session related parameters. The request from the PCRF1 30 may also include the service or the subscription related information; thereby the PCRF2 50 would not need to issue a separate request for this subscription related information from subscriber registers, thus, saving processing time. Furthermore, if the IP address of the PCRF2 50 is in the request from the PCRF1 30, the AF/P-CSCF 60 uses the IP address of the PCRF2 50 as a contact address to the PCRF2 50. On the other hand, if the IP address of the PCRF2 50 is not included in the request but a parameter is included in the request indicative of a new type of handover access, and, consequently, indicative of a need to use a new PCRF to continue with the HANDOVER session, the AF/P-CSCF 60 determines the IP address of the new PCRF from the parameter and the IP address of the UE 10 or other identity information available from the UE 10. After step 260, the inter-access handover proceeds to either step 270 or step 275.

In one aspect of the present invention, at step 270, the AF/P-CSCF 60 pushes the authorization information or session information and the possible service or the subscription related information to the PCRF2 50. The AF/P-CSCF 60 may also send IP address of the GW2 40 to enable the PCRF2 50 to find the GW2 40.

In an alternative, at step 275, the PCRF1 30 sends an authorization message including an authorization decision or session information and/or subscriber data directly to the PCRF2 50 because the PCRF1 30 has the information and the IP address of the PCRF2 50. In this instance, the AF/CSCF 60 updates the PCRF related information, the session which is now managed by the PCRF2 50 instead of the PCRF1 30, when receiving the reporting message (step 260) from the PCRF1 30. The inter-access handover proceeds to step 280.

At step 280, the PCRF2 50 sends an authorization decision to the GW2 40 or, in the alternative; the GW2 40 may request the authorization decision from the PCRF2 50. Accordingly, the GW2 40 enforces the policy decision based on the PCRF2 50 authorization and the IP session may continue through the new access (i.e., through the GW2 40 and the PCRF2 50).

Figure 5:
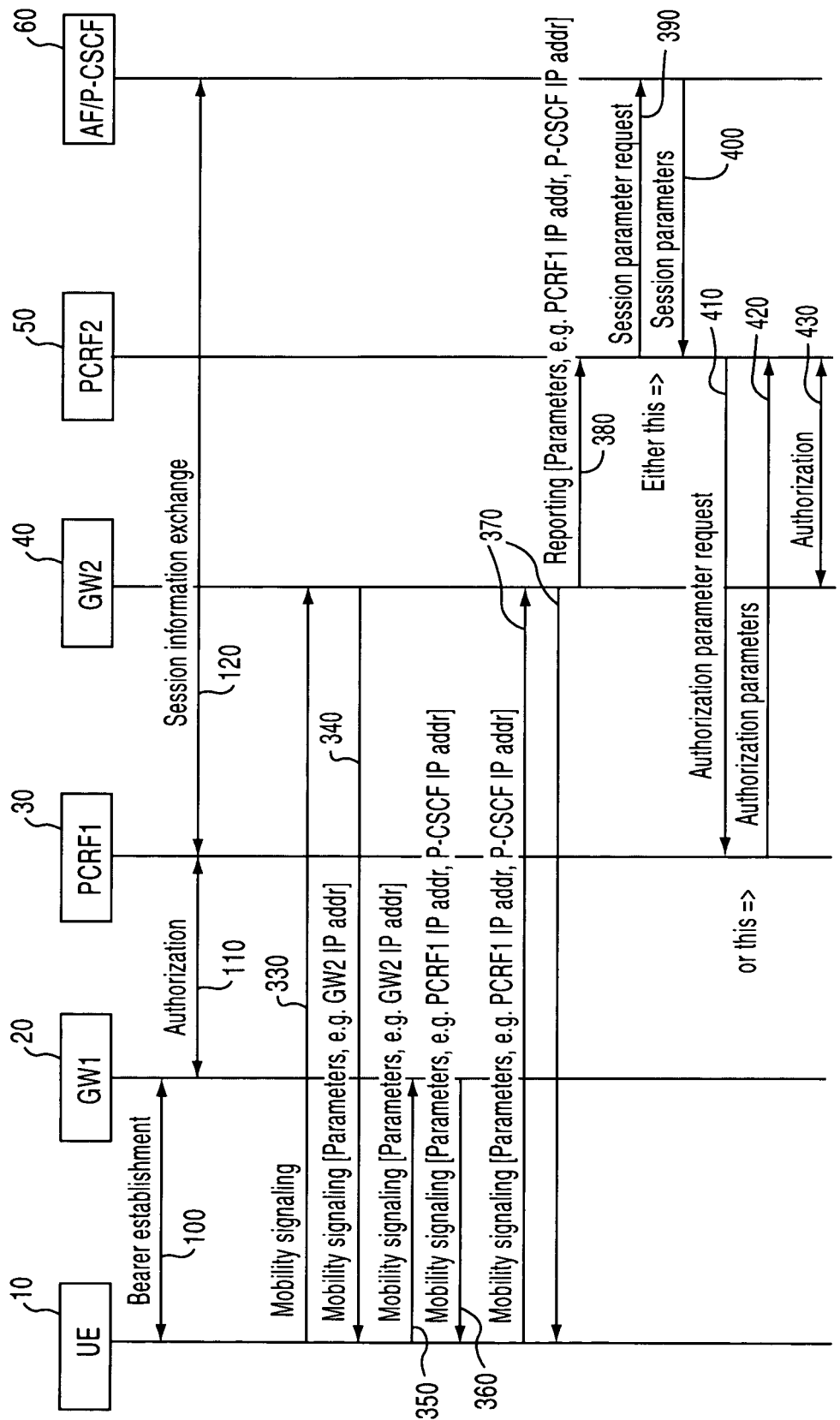
FIG. 5 illustrates an inter-access handover via the mobile user equipment (UE) with access specific policy control functions between an old gateway and AF/P-CSCF and between a new gateway and AF/P-CSCF, in accordance with an embodiment of the present invention.

FIG. 5 illustrates an inter-access handover via the mobile user equipment (UE) with access specific policy control functions between an old gateway and AF/P-CSCF and between a new gateway and AF/P-CSCF, in accordance with an embodiment of the present invention. Similarly to the embodiment illustrated in FIG. 3, FIG. 5 illustrates the mobile user equipment (UE) 100 exchanging information between the GW1 20, the old Policy Control and Charging Rules Function (PCRF1) 30, the new gateway (GW2) 40, the new Policy Control and Charging Rules Function (PCRF2) 50, and the Application Function (AF)/Proxy Call Session Control Function (P-CSCF) 60.

The description corresponding to steps 100 to 120 described in FIG. 3 are incorporated herein. From step 120, the handover proceeds to step 330. At step 330, the mobility signaling is requested from the UE 10 to the new gateway GW2 40 for the inter-access handover and the GW2 40 transmits information parameters to the UE 10 to support mobility.

At step 340, in reply to the mobility signaling requested by the UE 10, the GW2 40 transmits the information parameters to the UE 10 for mobility. Such information parameters may include, for instance, identity associated with the GW2 40 and/or IP address of the GW2 40. At step 350, the UE 10 relays or transmits the information parameters to the old gateway GW1 20. In reply, at step 360, the GW1 20 transmits mobility signaling parameters to the UE 10 including the IP address of the old PCRF1 30 and the IP address of the AF/P-CSCF 60.

At step 370, based on the information parameters (e.g., the IP address of the GW2 40) the UE 10 transmits to the GW2 40 the mobility signaling parameters and information parameters which may comprise the PCRF1 30 IP address and the AF/P-CSCF 60 IP address, and the GW2 40 confirms a handover request. At step 380, the GW2 40 reports the parameters to the PCRF2 50 to request authorization for the ongoing session(s) from the PCRF2 50. After step 380, the inter-access handover proceeds to either step 390 or step 410.

In one aspect of the present invention, using the IP address of the AF/P-CSCF 60, at step 390, the PCRF2 50 sends a session parameter request to the AF/P-CSCF 60. In this instance, the PCRF2 50 may have to make possible service/subscription related register inquiries to the PCRF1 30 or to a subscriber data register (not shown) if the service subscription related information is used for the authorization decision. At step 400, the AF/P-CSCF 60 sends to the PCRF2 50 session information including possible service or the subscription related information. The inter-access handover proceeds to step 430.

In an alternative, using the IP address of the PCRF1 30, at step 410, the PCRF2 50 would send an authorization parameter request to the PCRF1 30 and possible service or subscription related data, which the PCRF1 30 had previously requested from relevant registers, and/or possibly the current authorization decision from the PCRF1 30. At step 420, the PCRF1 30 sends authorization parameters and/or subscriber related data and/or the current authorization decision to the PCRF2 50. The PCSF1 may also provide the information parameters to the AF/P-CSCF 60. The PCRF2 50 would make an authorization decision based on the authorization parameters or would adapt the authorization decision from the PCRF1 30 of an existing session(s), taking into account requirements and limitations specific to the new session(s) or access type. The inter-access handover proceeds to step 430.

At step 430, the PCRF2 50 sends an authorization decision to the GW2 40, i.e., as a push operation. In the alternative, the GW2 40 may request the authorization decision from the PCRF2 50, i.e. as a pull operation. The GW2 40 would then enforce the authorization decision.

Figure 6:
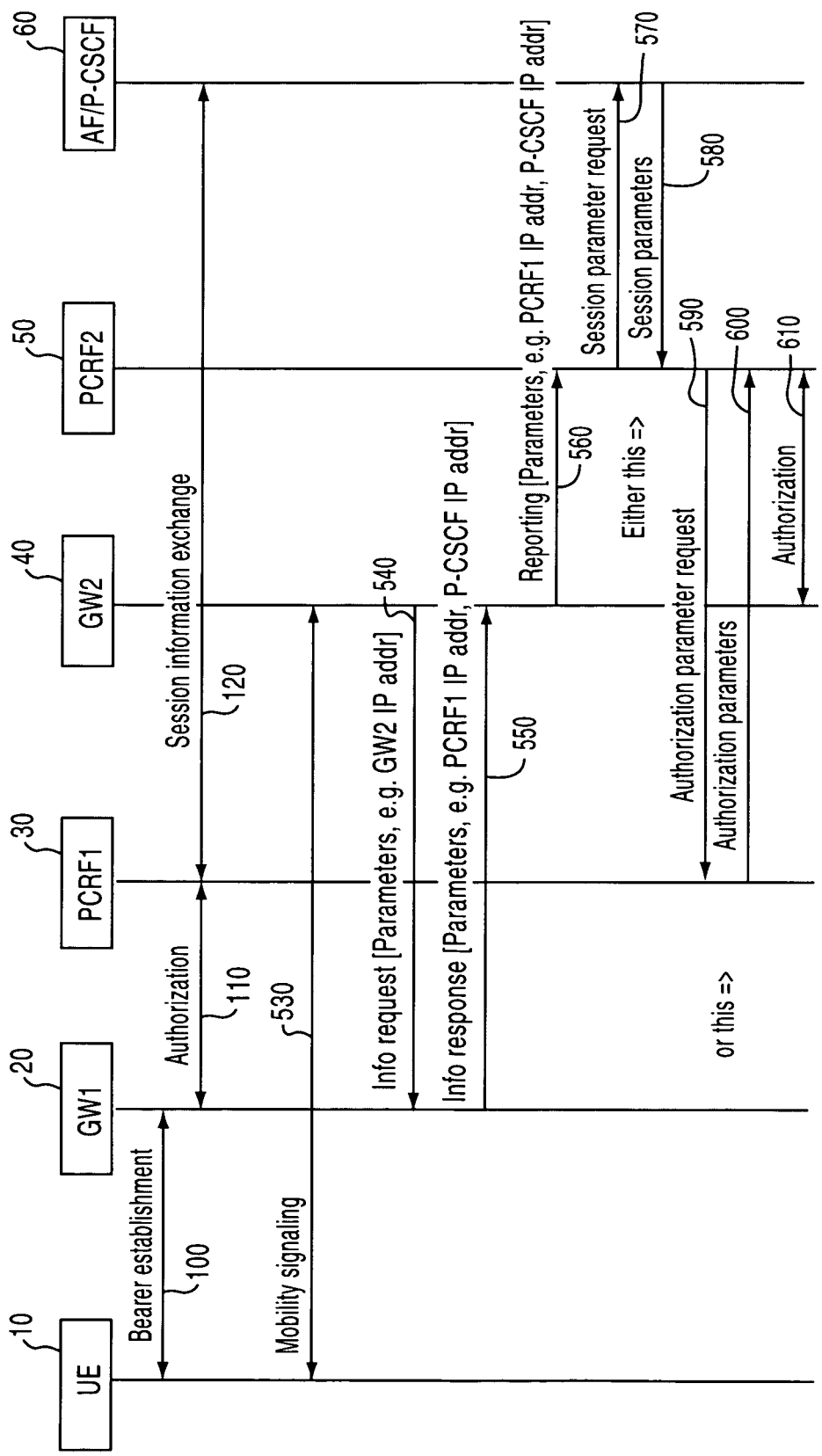
FIG. 6 illustrates a direct inter-access handover signaling between the old gateway and the new gateway, in accordance with an embodiment of the present invention.

FIG. 6 illustrates a direct inter-access handover signaling between the old gateway, GW1 20, and the new gateway, GW2 40, in accordance with an embodiment of the present invention. Similarly to the embodiment illustrated in FIG. 3, FIG. 6 illustrates the mobile user equipment (UE) 100 exchanging information between the GW1 20, the old Policy Control and Charging Rules Function (PCRF1) 30, the new gateway (GW2) 40, the new Policy Control and Charging Rules Function (PCRF2) 50, and the Application Function (AF)/Proxy Call Session Control Function (P-CSCF) 60.

The description corresponding to steps 100 to 120 described in FIG. 3 are incorporated herein. From step 120, at step 530, the mobility signaling is requested from the UE 10 to the new gateway GW2 40 for the inter-access handover and the GW2 40 transmits the information parameters to the UE 10 to support mobility. The request from the UE 10 the GW2 40 may contain, in addition to other related parameters, the IP address or identity information of the old gateway GW1 20.

At step 540, the GW2 40 transmits an information request to the GW1 20 including the IP address of the GW2 40. At step 550, in response to the information request, the GW1 20 transmits an information response to the GW2 40 including the IP address of the PCRF1 30 and the IP address of the AF/P-CSCF 60. At step 560, the GW2 40 relays or transmits the information response to the PCRF2 50.

In one aspect of the present invention, after step 560, using the IP address of the AF/P-CSCF 60, at step 570, the PCRF2 50 sends the session parameter request to the AF/P-CSCF 60. In this instance, the PCRF2 50 may have to make possible service/subscription related register inquiries to the PCRF1 30 or to a subscriber data register (not shown) if the service subscription related information is used for the authorization decision. At step 580, the AF/P-CSCF 60 sends to the PCRF2 50 session information including possible service or subscription related information. The direct inter-access handover signaling then proceeds to step 610.

In an alternative, after step 560, using the IP address of the PCRF1 30, at step 590, the PCRF2 50 would send an authorization parameter request to the PCRF1 30 and possible service or subscription related data, which the PCRF1 30 had previously requested from relevant registers, and/or possibly the current authorization decision from the PCRF1 30. At step 600, the PCRF1 30 sends the authorization parameters and/or subscriber related data and/or the current authorization decision to the PCRF2 50. The PCSF1 may also provide the information parameters to the AF/P-CSCF 60. The PCRF2 50 would make an authorization decision based on the authorization parameters or would adapt the authorization decision from the PCRF1 30 of an existing session(s), taking into account requirements and limitations specific to the new session(s) or access type. The direct inter-access handover signaling proceeds to step 610.

At step 610, the PCRF2 50 sends an authorization decision to the GW2 40, i.e., as a push operation. In the alternative, the GW2 40 may request the authorization decision from the PCRF2 50, i.e., as a pull operation. The GW2 40 would then enforce the authorization decision.

Accordingly, FIGS. 3 and 4 illustrate a handover mechanism in which the AF obtains the address of the new Policy Control and Charging Rules Function (PRCF2) and sends session information to the PRCF2 and FIGS. 5 and 6 illustrate a handover mechanism in which the PCRF2 50 obtains the address from the old Policy Control and Charging Rules Function (PRCF1) and/or the Application Function AF/P-CSCF 60 and requests the session information. Accordingly, the present invention offers a seamless inter-access handover without any interruptions or delays. Signaling trafficking is minimized that may be required to update the new control element (i.e., the GW2 40 and the PCRF2 50) with the required session information.

In addition, a person of ordinary skill in the art will appreciate that although the old and the new policy control and charging rules functions are described and illustrated separate from the access gateway, GW1 or GW2, or the AF/P-CSCF, a person of ordinary skill in the art will appreciate that the old policy control and charging rules functions and/or the new policy control and charging rules function may be integrated as part of the access gateway or the AF/P-CSCF.

Figure 7:
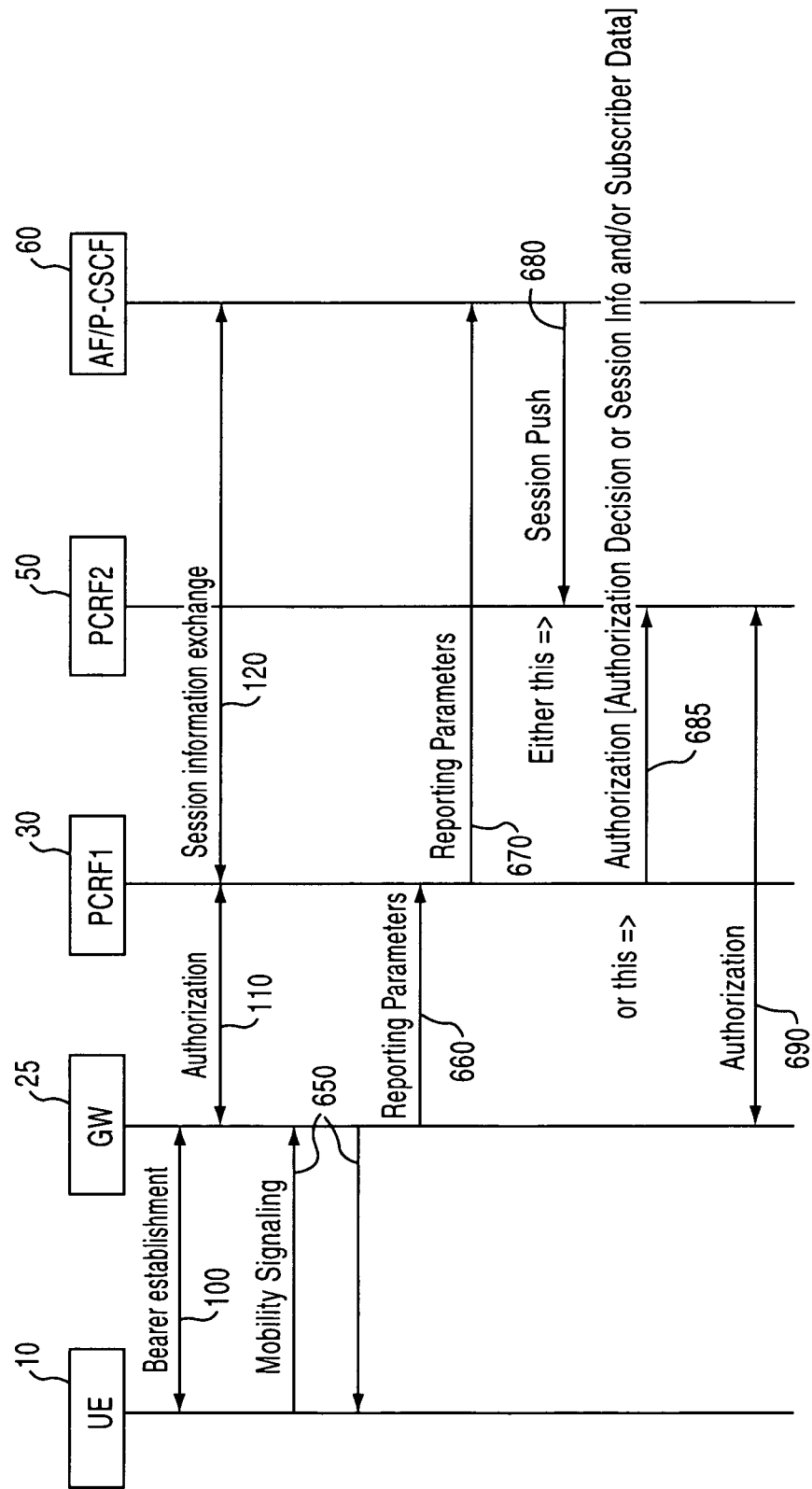
FIG. 7 illustrates an inter-access handover via a mobile user equipment (UE) with access specific policy control functions between a single gateway and AF/P-CSCF, in accordance with an embodiment of the present invention.

Furthermore, although FIGS. 3 to 6 illustrate an old access gateway, GW1, and a new access gateway, GW2, a person of ordinary skilled in the art will appreciate that a single gateway may be provided to include the structure and functions associated with the old access gateway and the new access gateway as a single unit. For instance, FIG. 7 illustrates an inter-access handover via the UE 10 with access specific policy control functions between a single gateway and AF/P-CSCF, in accordance with an embodiment of the present invention. The description corresponding to steps 100 to 120 described in FIG. 3 are incorporated herein. From step 120, the handover proceeds to step 650. At step 650, the UE 10 exchanges information with a single gateway, GW, 25 for mobility. Specifically, the UE 10 exchanges the information parameters with the GW 25.

At step 660, the GW 25 sends an indication/report of the handover with the information parameters to the old policy control function, PCRF1 30. At step 670, upon processing of the information parameters, the PCRF1 30 requests session information for the ongoing sessions from the AF/P-CSCF 60 to be sent from the application function AF/P-CSCF 60 to the new Policy and Charging Rules Function the PCRF2 50 based on the information parameters. The request would also provide the information parameters to the AF/P-CSCF 60. The request from the PCRF1 30 may also include authorization information, e.g. an authorization made previously by the PCRF1 30 for the session, or session related parameters. The request from the PCRF1 30 may also include service or subscription related information, thereby the PCRF2 50 would not need to issue a separate request for this subscription related information from subscriber registers, thus, saving processing time. Furthermore, if the IP address of the PCRF2 50 is in the request from the PCRF1 30, the AF/P-CSCF 60 uses the IP address of the PCRF2 50 as a contact address to the PCRF2 50. On the other hand, if the IP address of the PCRF2 50 is not included in the request but a parameter is included in the request indicative of a new type of handover access, and, consequently, indicative of a need to use a new PCRF to continue with the HANDOVER session, the AF/P-CSCF 60 determines the IP address of the new PCRF from the parameter and the IP address of the UE 10 or other identity information available from the UE 10. After step 670, the inter-access handover proceeds to either step 680 or step 685.

In one aspect of the present invention, at step 680, the AF/P-CSCF 60 pushes the authorization information or session information and the possible service or the subscription related information to the PCRF2 50. The inter-access handover proceeds to step 1090.

In an alternative, at step 685, the PCRF1 30 sends an authorization message including an authorization decision or session information and/or subscriber data directly to the PCRF2 50 because the PCRF1 30 has the information and the IP address of the PCRF2 50. In this instance, the AF/CSCF 60 updates the PCRF related information, the session which is now managed by the PCRF2 50 instead of the PCRF1 30, when receiving the reporting message (step 670) from the PCRF1 30. The inter-access handover proceeds to step 690.

At step 690, the PCRF2 50 sends an authorization decision to the GW 25 or, in the alternative, the GW 25 may request the authorization decision from the PCRF2 50. Accordingly, the GW 25 enforces the policy decision based on the PCRF2 50 authorization and the IP session may continue through the new access (i.e., through the PCRF2 50).

Figure 8:
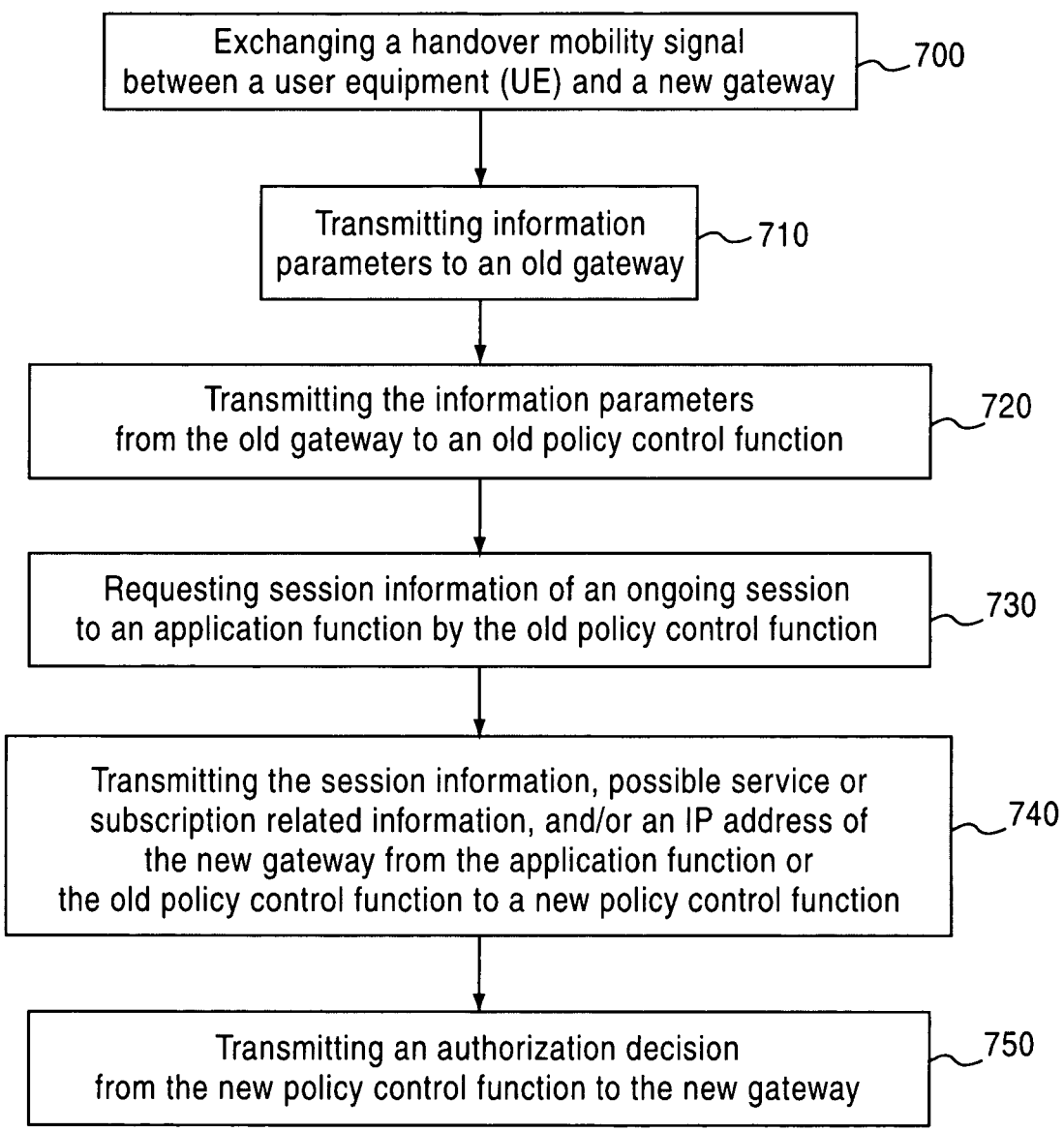
FIG. 8 illustrates an inter-access handover method, in accordance with an embodiment of the present invention.

In accordance with an embodiment of the present invention, FIG. 8 illustrates an inter-access handover method including, at step 700, exchanging a handover mobility signal between a user equipment (UE) and a new gateway. At step 710, the method transmits information parameters to an old gateway in response to the handover mobility signal. At step 720, the method transmits the information parameters from the old gateway to an old policy control function. At step 730, the method requests session information of an ongoing session from an application function by the old policy control function. At step 740, the inter-access handover method transmits, based on the information parameters, the session information, possible service or subscription related information, and/or an IP address of the new gateway from the application function or the old policy control function to a new policy control function. At step 750, the method transmits an authorization decision from the new policy control function to the new gateway to continue the session through the new gateway and the new policy control function.

Figure 9:
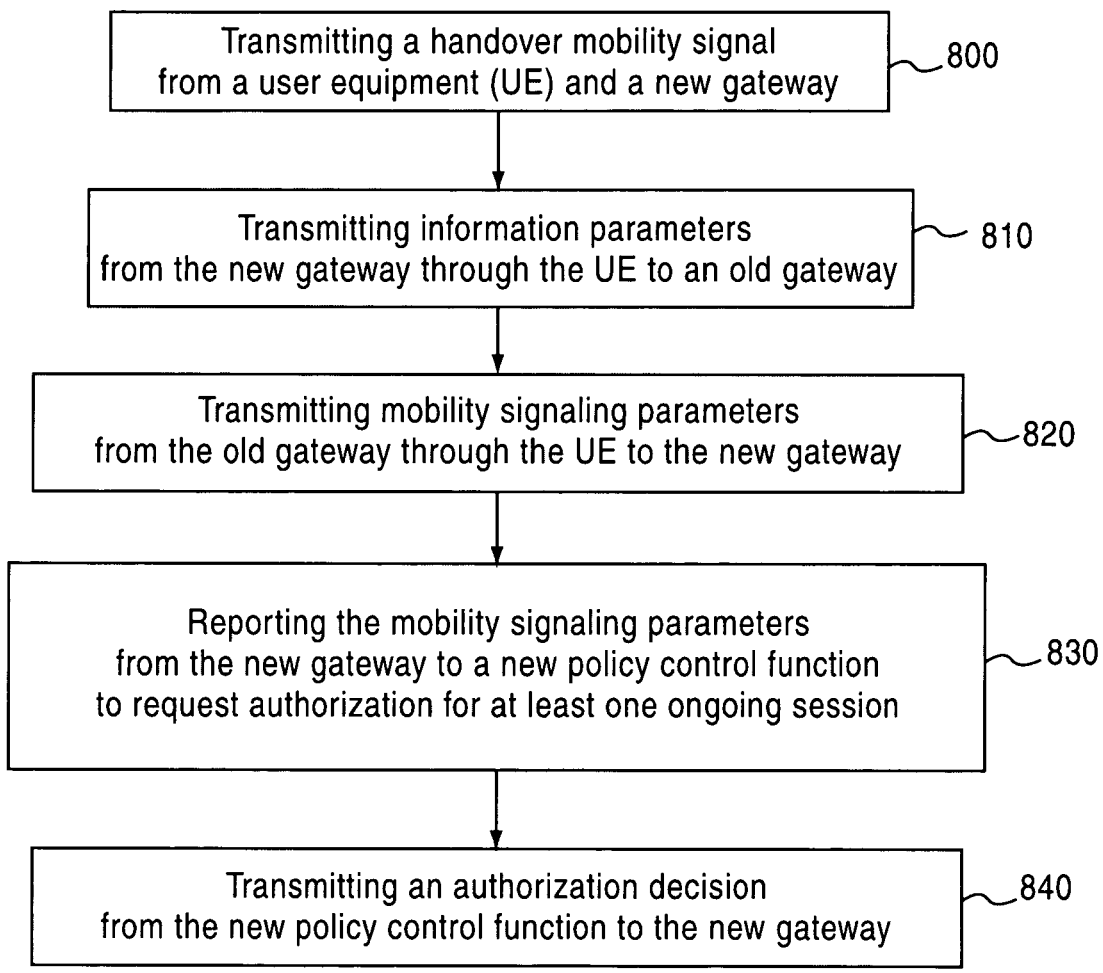
FIG. 9 illustrates the inter-access handover method, in accordance with an alternative embodiment of the present invention.

In accordance with an embodiment of the present invention, FIG. 9 illustrates an alternative embodiment of an inter-access handover method including, at step 800, transmitting a handover mobility signal from a user equipment (UE) to a new gateway. At step 810, the method transmits information parameters from the new gateway through the UE to an old gateway in response to the handover mobility signal. At step 820, the method transmits, based on the information parameters, mobility signaling parameters from the old gateway through the UE to the new gateway, the mobility signaling parameters including an IP address of an old policy control function and an IP address of an application function. At step 830, the method reports the mobility signaling parameters from the new gateway to a new policy control function to request authorization for at least one ongoing session. At step 840, the method transmits an authorization decision from the new policy control function to the new gateway to continue the at least one ongoing session through the new gateway and the new policy control function.

Figure 10:
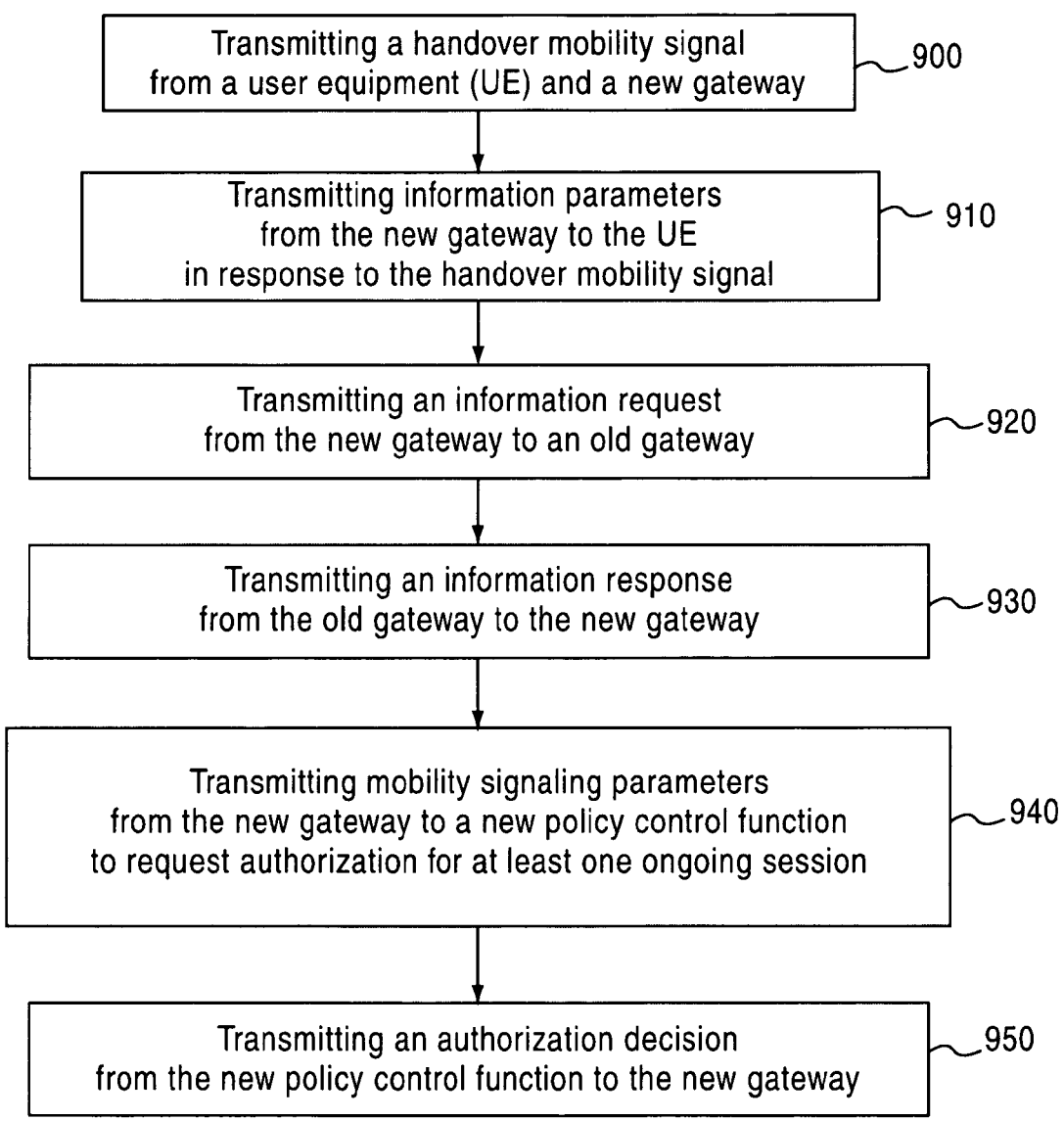
FIG. 10 illustrates a direct inter-access handover method, in accordance with an embodiment of the present invention.

In accordance with an embodiment of the present invention, FIG. 10 illustrates a direct inter-access handover method including, at step 900, transmitting a handover mobility signal from a user equipment (UE) to a new gateway. At step 910, the method transmits information parameters from the new gateway to the UE in response to the handover mobility signal. At step 920, the method transmits an information request from the new gateway to an old gateway. At step 930, the method transmits an information response from the old gateway to the new gateway, the information response including an IP address of an old policy control function and an IP address of an application function. At step 940, the method transmits, based on the information response, mobility signaling parameters from the new gateway to a new policy control function to request authorization for at least one ongoing session. At step 950, the method transmits an authorization decision from the new policy control function to the new gateway to continue the at least one ongoing session through the new gateway and the new policy control function.

It is to be understood that in the embodiment of the present invention, the steps are performed in the sequence and manner as shown although the order of some steps and the like may be changed without departing from the spirit and scope of the present invention.

The present invention may be applicable, although not limited, to packet switched services in a mobile communication system. Such services include packet switched communication between a mobile client terminal of an end-user and an application server. The mobile communication system includes a radio network such as for example a WCDMA, CDMA2000, Wireless LAN or GPRS network in which the mobile client terminal resides. The system may also include a wired access such as for example an xDSL.

With respect to the present invention, network devices may be any device that utilizes network data, and can include switches, routers, bridges, gateways or servers. In addition, while the term data has been used in the description of the present invention, the invention has import to many types of network data. For purposes of this invention, the term data includes packet, cell, frame, datagram, bridge protocol data unit packet, packet data and any equivalents thereof.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and step illustrated and described, and accordingly all suitable modifications and equivalents may be resorted to, falling within the scope of the invention.

What is claimed:
1. A method, comprising:
   receiving information parameters at an old gateway in response to a handover mobility signal sent by a user equipment toward a new gateway, the handover mobility signal being associated with an inter-access handover of the user equipment, wherein the inter-access handover of the user equipment comprises one of a handover of the user equipment from a mobile access network to a fixed broadband access network or a handover of the user equipment from the fixed broadband access network to the mobile access network;
   causing transmission of the information parameters from the old gateway to an old policy control function;
   causing, based at least in part on the received information parameters, an authorization message including one or more of an authorization decision, session information, or subscriber data related to an ongoing session to be sent from the old policy control function to a new policy control function;
   setting up a service between the user equipment and an application function;
   receiving, at the old gateway, a request for a bearer establishment transmitted by the user equipment;
   accepting the request at the old gateway and assigning an interne protocol address to the user equipment;

requesting an authorization by the old gateway to the old policy control function of at least one service and rules information associated with the user equipment;

authorizing the at least one service and at least one policy decision by the old policy control function; and causing the policy decisions to be sent back to the old gateway to enforce the policy decisions and to acknowledge the bearer establishment request, wherein the new policy control function is configured to transmit an authorization decision to the new gateway to continue the session through the new gateway and the new policy control function, and wherein the session comprises a plurality of different internet protocol data flows with specific requirements for bearer resources.

2. The method as recited in claim 1, wherein receiving the information parameters at the old gateway comprises one of receiving information parameters transmitted from the user equipment to the old gateway in response to the handover mobility signal, or receiving information parameters transmitted from the new gateway to the old gateway in response to the handover mobility signal.

3. The method as recited in claim 1, wherein the handover mobility signal comprises an internet protocol address or identity information of the old gateway, the method further comprising:

using by the new gateway the internet protocol address or the identification information of the old gateway to find the old gateway.

4. The method as recited in claim 1, wherein the information parameters comprise one or more of identity information associated with the new gateway, an internet protocol address of the new gateway, an internet protocol address associated with the new policy control function, or an internet protocol address of an application function.

5. The method as recited in claim 1, further comprising:

exchanging session information between the old policy control function and an application function in order to receive the subscription related information comprising information about at least one service for the user equipment and rules information comprising Policy and Charging Control (PCC) rules information.

6. The method as recited in claim 1, further comprising requesting, by the old policy control function, session information of an ongoing session from an application function, the requesting comprising providing the information parameters to the application function.

7. The method as recited in claim 6, wherein, in an instance in which the internet protocol address of the new policy control function is in the request from the old policy control function, the application function uses the internet protocol address of the new policy control function as a contact address to the new policy control function.

8. The method as recited in claim 6, wherein, in an instance in which the internet protocol address of the new policy control function is not included in the request but a parameter is included in the request indicative of a new type of handover access, further comprising:

providing a need to use a new policy control function to continue with the handover session; and determining by the application function the internet protocol address of the new policy control function from the parameter and the internet protocol address of the user equipment or other identity information available from the user equipment.

9. A computer program product comprising at least one non-transitory computer readable medium, the at least one non-transitory computer readable medium storing program instructions configured to control one or more processors to perform:

receiving information parameters at an old gateway in response to a handover mobility signal sent by a user equipment toward a new gateway, the handover mobility signal being associated with an inter-access handover of the user equipment, wherein the inter-access handover of the user equipment comprises one of a handover of the user equipment from a mobile access network to a fixed broadband access network or a handover of the user equipment from the fixed broadband access network to the mobile access network;

causing transmission of the information parameters from the old gateway to an old policy control function;

causing, based at least in part on the received information parameters, an authorization message including one or more of an authorization decision, session information, or subscriber data related to an ongoing session to be sent from the old policy control function to a new policy control function;

setting up a service between the user equipment and an application function;

receiving, at the old gateway, a request for a bearer establishment transmitted by the user equipment;

accepting the request at the old gateway and assigning an internet protocol address to the user equipment;

requesting an authorization by the old gateway to the old policy control function of at least one service and rules information associated with the user equipment;

authorizing the at least one service and policy decisions by the old policy control function; and causing sending of the policy decisions back to the old gateway to enforce the policy decisions and acknowledge the bearer establishment request, wherein the new policy control function is configured to transmit an authorization decision to the new gateway to continue the session through the new gateway and the new policy control function, and wherein the session comprises a plurality of different internet protocol data flows with specific requirements for bearer resources.

10. The computer program product as recited in claim 9, wherein the receiving of the information parameters at the old gateway comprises one of receiving information parameters transmitted from the user equipment to the old gateway in response to the handover mobility signal, or receiving information parameters transmitted from the new gateway to the old gateway in response to the handover mobility signal.

11. The computer program product as recited in claim 9, wherein the handover mobility signal comprises an internet protocol address or identity information of the old gateway, the program instructions further comprising program instructions configured to cause the one or more processors to perform:

using by the new gateway the internet protocol address or the identity information of the old gateway to find the old gateway.

12. The computer program product as recited in claim 9, wherein the information parameters comprise one or more of identity information associated with the new gateway, an internet protocol address of the new gateway, an internet protocol address associated with the new policy control function, or an internet protocol address of an application function.

13. The computer program product as recited in claim 9, further comprising program instructions configured to cause the one or more processors to perform:

exchanging session information between the old policy control function and an application function in order to receive the subscription related information comprising information about at least one service for the user equipment and rules information comprising Policy and Charging Control (PCC) rules information.

14. The computer program product as recited in claim 9, further comprising program instructions configured to cause the one or more processors to perform requesting session information of an ongoing session from an application function by the old policy control function to allow transmission, the requesting comprising providing the information parameters to the application function.

15. The computer program product as recited in claim 14, wherein, in an instance in which the internet protocol address of the new policy control function is in the request from the old policy control function, the application function uses the internet protocol address of the new policy control function as a contact address to the new policy control function.

16. The computer program product as recited in claim 14, wherein, in an instance in which the internet protocol address of the new policy control function is not included in the request but a parameter is included in the request indicative of a new type of handover access, further comprising program instructions configured to cause the one or more processors to perform:

providing a need to use a new policy control function to continue with the handover session; and determining by the application function the internet protocol address of the new policy control function from the parameter and the internet protocol address of the user equipment or other identity information available from the user equipment.

17. A system, comprising:

a new gateway configured to receive a handover mobility signal from a user equipment and to transmit information parameters to an old gateway in response to the handover mobility signal, the handover mobility signal being associated with an inter-access handover of the user equipment, wherein the inter-access handover of the user equipment comprises one of a handover of the user equipment from a mobile access network to a fixed broadband access network or a handover of the user equipment from the fixed broadband access network to the mobile access network;

an old policy control function configured to receive the information parameters from the old gateway and configured to request session information of an ongoing session from an application function, to further request one or more of service information or subscription related information, to additionally send an authorization message including one or more of an authorization decision, session information, or subscriber data related to the ongoing session to a new policy control function, to authorize at least one service and at least one policy decision and to send the policy decisions to the old gateway to enforce the policy decisions and acknowledge the bearer establishment request;

the old gateway configured to receive a request from a bearer establishment transmitted by the user equipment, to accept the request and assign an internet protocol address to the user equipment, to request an authorization of the at least one service and rules information associated with the user equipment from the old policy control function;

the application function configured to set up a service between the user equipment and the application function; and the new policy control function, the new policy control function being configured to receive from an application function or the old policy control function, based on the information parameters, one or more of the session information, service information, subscription related information, or an internet protocol address of the new gateway, and configured to transmit an authorization decision to the new gateway to continue the session through the new gateway and the new policy control function, wherein the session comprises a plurality of different internet protocol data flows with specific requirements for bearer resources.

18. The system as recited in claim 17, wherein the new gateway is configured to transmit the information parameters to the old gateway by performing one of transmitting the information parameters from the user equipment to the old gateway in response to the handover mobility signal, or transmitting the information parameters from the new gateway to the old gateway in response to the handover mobility signal.

19. The system as recited in claim 17, wherein the handover mobility signal from the user equipment to the new gateway comprises an internet protocol address or identity information of the old gateway, and wherein the new gateway is configured to use the internet protocol address or the identity information of the old gateway to find the old gateway.

20. The system as recited in claim 17, wherein the information parameters comprise one or more of identity information associated with the new gateway, an internet protocol address of the new gateway, an internet protocol address associated with the new policy control function, or an internet protocol address of the application function.

21. A method, comprising:

receiving, at an old policy control function, information parameters transmitted by an old gateway in response to a handover mobility signal sent by a user equipment toward a new gateway, the handover mobility signal being associated with an inter-access handover of the user equipment, wherein the inter-access handover of the user equipment comprises one of a handover of the user equipment from a mobile access network to a fixed broadband access network or a handover of the user equipment from the fixed broadband access network to the mobile access network;

causing, based at least in part on the received information parameters, an authorization message including one or more of an authorization decision, session information, or subscriber data related to an ongoing session to be sent from the old policy control function to a new policy control function;

setting up a service between the user equipment and an application function;

receiving, at the old gateway, a request for a bearer establishment transmitted by the user equipment;

accepting the request at the old gateway and assigning an internet protocol address to the user equipment;

requesting an authorization by the old gateway to the old policy control function of at least one service and rules information associated with the user equipment;

authorizing the at least one service and at least one policy decision by the old policy control function; and causing the policy decisions to be sent back to the old gateway to enforce the policy decisions and to acknowledge the bearer establishment request, wherein the new policy control function is configured to transmit an authorization decision to the new gateway to continue the session through the new policy control function and the new gateway, and wherein the session comprises a plurality of different internet protocol data flows with specific requirements for bearer resources.

22. An apparatus comprising at least one processor and at least one memory storing computer program code, wherein the at least one memory and stored computer program code are configured, with the at least one processor, to cause the apparatus to at least:

receive information parameters transmitted by an old gateway in response to a handover mobility signal sent by a user equipment toward a new gateway, the handover mobility signal being associated with an inter-access handover of the user equipment, wherein the inter-access handover of the user equipment comprises one of a handover of the user equipment from a mobile access network to a fixed broadband access network or a handover of the user equipment from the fixed broadband access network to the mobile access network;

cause, based at least in part on the received information parameters, an authorization message including one or more of an authorization decision, session information, or subscriber data related to an ongoing session to be sent to a new policy control function;

setting up a service between the user equipment and an application function;

receiving, at the old gateway, a request for a bearer establishment, transmitted by the user equipment;

accepting the request at the old gateway and assigning an internet protocol address to the user equipment;

requesting an authorization by the old gateway to the old policy control function of at least one service and rules information associated with the user equipment;

authorizing the at least one service and at least one policy decision by the old policy control function; and causing the policy decisions to be sent back to the old gateway to enforce the policy decisions and to acknowledge the bearer establishment request, wherein the new policy control function is configured to transmit an authorization decision to the new gateway to continue the session through the new policy control function and the new gateway, and wherein the session comprises a plurality of different internet protocol data flows with specific requirements for bearer resources.

23. The method as recited in claim 21, wherein the information parameters comprise one or more of identity information associated with the new gateway, an internet protocol address of the new gateway, an internet protocol address associated with the new policy control function, or an internet protocol address of an application function.

24. The method as recited in claim 21, further comprising:
causing exchange of session information between the old policy control function and an application function in order to receive the subscription related information comprising information about at least one service for the user equipment and rules information comprising Policy and Charging Control (PCC) rules information.

25. The apparatus as recited in claim 22, wherein the information parameters comprise one or more of identity information associated with the new gateway, an internet protocol address of the new gateway, an internet protocol address associated with the new policy control function, or an internet protocol address of an application function.

26. The apparatus as recited in claim 22, wherein the at least one memory and stored computer program code are configured, with the at least one processor, to further cause the apparatus to:
cause exchange of session information with an application function in order to receive the subscription related information comprising information about at least one service for the user equipment and rules information comprising Policy and Charging Control (PCC) rules information.

27. A computer program product comprising at least one non-transitory computer readable medium, the at least one non-transitory computer readable medium storing program instructions configured to control a processor to perform:

receiving, at an old policy control function, information parameters transmitted by an old gateway in response to a handover mobility signal sent by a user equipment toward a new gateway, the handover mobility signal being associated with an inter-access handover of the user equipment, wherein the inter-access handover of the user equipment comprises one of a handover of the user equipment from a mobile access network to a fixed broadband access network or a handover of the user equipment from the fixed broadband access network to the mobile access network;

causing, based at least in part on the received information parameters, an authorization message including one or more of an authorization decision, session information, or subscriber data related to an ongoing session to be sent from the old policy control function to a new policy control function;

setting up a service between the user equipment and an application function;

receiving, at the old gateway, a request for a bearer establishment transmitted by the user equipment;

accepting the request at the old gateway and assigning an interne protocol address to the user equipment;

requesting an authorization by the old gateway to the old policy control function of at least one service and rules information associated with the user equipment;

authorizing the at least one service and at least one policy decision by the old policy control function; and causing the policy decisions to be sent back to the old gateway to enforce the policy decisions and to acknowledge the bearer establishment request, wherein the new policy control function is configured to transmit an authorization decision to the new gateway to continue the session through the new policy control function and the new gateway, and wherein the session comprises a plurality of different internet protocol data flows with specific requirements for bearer resources.

28. The method as recited in claim 21, wherein one of the old policy control function and the new policy control function is a mobile network policy control function and the other is a fixed broadband network policy control function, and one of the old gateway and the new gateway is a mobile network gateway and the other is a fixed broadband network gateway.

29. The method as recited in claim 21, wherein one or more of the session information or the subscriber data was received by the old policy control function upon setup of the session from one or more of an application function or a subscriber register.

30. The apparatus as recited in claim 22, wherein one of the apparatus and the new policy control function is a mobile network policy control function and the other is a fixed broadband network policy control function, and one of the old gateway and the new gateway is a mobile network gateway and the other one is a fixed broadband network gateway.

31. The apparatus as recited in claim 22, wherein one or more of the session information or the subscriber data was received by the apparatus upon setup of the session from one or more of an application function or a subscriber register.

32. The apparatus as recited in claim 22, wherein the received information parameters comprise one or more of an internet protocol address or identity information.

33. The apparatus as recited in claim 32, wherein the at least one memory and stored computer program code are configured, with the at least one processor, to further cause the apparatus to cause the one or more of the internet protocol address or identity information to be sent to the new policy control function.

34. The apparatus as recited in claim 33, wherein the at least one memory and stored computer program code are configured, with the at least one processor, to further cause the apparatus to use the received information parameters to determine an address associated with the new policy control function, and to use the address determined to be associated with the new policy control function to cause the one or more of the internet protocol address or identity information to be sent to the new policy control function.

35. The apparatus as recited in claim 32, wherein the one or more of the internet protocol address or identity information sent to the new policy control function is configured to enable the new policy control to find the new gateway.

36. The apparatus as recited in claim 22, wherein the received information parameters comprise one or more of an internet protocol address or identity information, and wherein the at least one memory and stored computer program code are configured, with the at least one processor, to further cause the apparatus to cause the one or more of the internet protocol address or identity information to be sent to the new policy control function to enable the new policy control function to find the new gateway.

* * * * *

UNITED STATES PATENT AND TRADEMARK OFFICE
CERTIFICATE OF CORRECTION

| | | |
|---|---|---|
| PATENT NO. | : 8,489,096 B2 | Page 1 of 1 |
| APPLICATION NO. | : 11/444372 | |
| DATED | : July 16, 2013 | |
| INVENTOR(S) | : Rasanen | |

It is certified that error appears in the above-identified patent and that said Letters Patent is hereby corrected as shown below:

In the Claims

<u>Column 14,</u>
Claim 1, Line 67, "interne protocol" should read --internet protocol--.

<u>Column 20,</u>
Claim 27, Line 41, "interne protocol" should read --internet protocol--.

Signed and Sealed this
Twelfth Day of November, 2013

Teresa Stanek Rea
*Deputy Director of the United States Patent and Trademark Office*